(12) United States Patent
Yan et al.

(10) Patent No.: US 11,049,099 B2
(45) Date of Patent: Jun. 29, 2021

(54) METHODS FOR IMPLEMENTING PRIVACY PROTECTION IN BLOCKCHAIN

(71) Applicant: Advanced New Technologies Co., Ltd., Grand Cayman (KY)

(72) Inventors: Ying Yan, Hangzhou (CN); Xuyang Song, Hangzhou (CN); Li Lin, Hangzhou (CN); Boran Zhao, Hangzhou (CN); Yirong Yu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/160,216

(22) Filed: Jan. 27, 2021

(65) Prior Publication Data
US 2021/0150524 A1 May 20, 2021

Related U.S. Application Data (63) Continuation of application No. PCT/CN2019/111304, filed on Oct. 15, 2019.

(30) Foreign Application Priority Data

Nov. 30, 2018 (CN) .......................... 201811452984.1

(51) Int. Cl.
*G06Q 20/38* (2012.01)
*G06Q 20/06* (2012.01)
(Continued)

(52) U.S. Cl.
CPC ... *G06Q 20/38215* (2013.01); *G06Q 20/0658* (2013.01); *G06Q 20/3829* (2013.01);
(Continued)

(58) Field of Classification Search
CPC ......... G06Q 20/38215; G06Q 20/0658; G06Q 20/3829; G06Q 20/4014; H04L 9/0637; H04L 9/0825; H04L 2209/56
(Continued)

(56) References Cited

U.S. PATENT DOCUMENTS 10,341,121 B2 * 7/2019 Androulaki ............. H04L 9/008
10,819,684 B2 * 10/2020 Ramos .................. H04L 9/3239
(Continued)

FOREIGN PATENT DOCUMENTS

CN          104506710          4/2015
CN          106559211          4/2017
(Continued)

OTHER PUBLICATIONS

Zhu et al., Security Attacks in Named Data Networking of Things and a Blockchain Solution, IEEE Internet of Things Journal, vol. 6, No. 3, Jun. 2019, pp. 4733-4741 (Year: 2019).*
(Continued)

*Primary Examiner* — James D Nigh
(74) *Attorney, Agent, or Firm* — Fish & Richardson P.C.

(57) ABSTRACT

A computer-implemented method includes receiving, by a first blockchain node, an encrypted transaction comprising a smart contract that includes code, wherein the code of the smart contract comprises a contract state indicated by a privacy identifier; decrypting, by the first blockchain node, the encrypted transaction to obtain the code of the smart contract in plaintext; executing, by the first blockchain node, the code of the smart contract in plaintext in a trusted execution environment; encrypting, by the first blockchain node using a key, the contract state indicated by the privacy identifier; and writing, by the first blockchain node, the encrypted contract state indicated by the privacy identifier to a database.

20 Claims, 5 Drawing Sheets

---

A client device encrypts a transaction including a smart contract, and sends the encrypted transaction to a first blockchain node, where code of the smart contract includes a contract state indicated by a privacy identifier  `401`

The first blockchain node decrypts the code of the smart contract in the transaction, executes the code of the smart contract in a trusted execution environment, uses a key to encrypt the contract state indicated by the privacy identifier, and writes the encrypted contract state to a database  `403`

(51) Int. Cl.
  *H04L 9/08* (2006.01)
  *H04L 9/06* (2006.01)
  *G06Q 20/40* (2012.01)
(52) U.S. Cl.
  CPC ....... *G06Q 20/4014* (2013.01); *H04L 9/0637* (2013.01); *H04L 9/0825* (2013.01); *H04L 2209/56* (2013.01)
(58) Field of Classification Search
  USPC .......................................................... 705/39
  See application file for complete search history.

(56) References Cited

U.S. PATENT DOCUMENTS

| 2015/0379510 | A1 | 12/2015 | Smith | |
|---|---|---|---|---|
| 2018/0326291 | A1 | 11/2018 | Tran et al. | |
| 2020/0084051 | A1* | 3/2020 | Bessonov | ........ G06Q 20/38215 |

FOREIGN PATENT DOCUMENTS

| CN | 106874781 | 6/2017 | |
|---|---|---|---|
| CN | 106980794 | 7/2017 | |
| CN | 107342858 | 11/2017 | |
| CN | 107528835 | 12/2017 | |
| CN | 107809316 | 3/2018 | |
| CN | 107911216 | 4/2018 | |
| CN | 108200079 | 6/2018 | |
| CN | 108389046 | 8/2018 | |
| CN | 108650647 | 10/2018 | |
| CN | 108776936 | 11/2018 | |
| CN | 108830716 | 11/2018 | |
| CN | CN 110032883 | 7/2019 | |
| CN | CN 110033368 | 7/2019 | |
| WO | WO-2019105407 A1 * | 6/2019 | ........... G06Q 20/405 |

OTHER PUBLICATIONS

Machine translation of CN104506710, cited as D2 in international search and written opinion, 29 pages, published Oct. 3, 2017 (Year: 2017).*
Machine translation of CN107911216, cited as D1 in international search and written opinion, 13 pages, published Apr. 4, 2018 (Year: 2018).*
English translation of written opinion for PCT/CN2019/11304, posted Jan. 15, 2020, 4 pages (Year: 2020).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/111304, dated Jan. 15, 2020, 12 pages (with partial English translation).

* cited by examiner

METHODS FOR IMPLEMENTING PRIVACY PROTECTION IN BLOCKCHAIN

CROSS-REFERENCE TO RELATED APPLICATIONS

This application is a continuation of PCT Application No. PCT/CN2019/111304, filed on Oct. 15, 2019, which claims priority to Chinese Patent Application No. 201811452984.1, filed on Nov. 30, 2018, and each application is hereby incorporated by reference in its entirety.

TECHNICAL FIELD

The present application relates to the field of blockchain technologies, and in particular, to methods for implementing privacy protection in a blockchain.

BACKGROUND

Blockchain technologies are built on transport networks (such as peer-to-peer networks). Network nodes in the transport network use a chaining data structure to verify and store data, and use a distributed node consensus algorithm to generate and update data. Nodes in these blockchain networks sometimes need to be increased.

At present, two biggest challenges of enterprise-level blockchain platform technologies are privacy and performance, which are often difficult to overcome at the same time. Most of the solutions are to gain privacy by losing performance, or pursue performance without considering privacy. Common encryption technologies for alleviating privacy problems, such as homomorphic encryption (Homomorphic encryption) and zero-knowledge proof (Zero-knowledge proof), have high complexity and poor universality, and may cause serious performance loss.

A trusted execution environment (TEE) is another solution to privacy problems. The TEE can act as a black box in hardware. The operating system layer cannot peep at code and data executed in the TEE, and only an interface predetermined in the code can operate on the code and the data. In terms of efficiency, due to the black box feature of the TEE, operation in the TEE uses plaintext data, and is not complex cryptographic operation in homomorphic encryption, so that there is no loss of efficiency in the computing process. Therefore, the combination with the TEE can greatly improve the security and privacy of the blockchain on the premise of less performance loss. At present, the industry pays close attention to TEE solutions. Almost all mainstream chip and software alliances have their own TEE solutions, including a trusted platform module (TPM) in terms of software and Intel software guard extensions (SGX), ARM TrustZone, and AMD platform security processor (PSP) in terms of hardware.

The emergence of smart contracts in the era of blockchain 2.0 improves the application scope of the blockchain to a new level. With the smart contract, the blockchain can not only perform a single transfer transaction, but also invoke a piece of code, which can be customized by users.

In conventional solutions of combining the blockchain and the TEE, to implement privacy protection, the whole smart contract is considered as the data that needs privacy protection and that needs to be computed in the TEE, and all contract states are encrypted and stored in the blockchain. In fact, some of the content in the smart contract may be sensitive and needs privacy protection, but the other content is not sensitive and can be made public. In existing solutions, there is no more flexible method to implement privacy protection.

SUMMARY

Embodiments of the present application aim to provide methods for implementing privacy protection in a blockchain.

To alleviate the previously described technical problem, the embodiments of the present application are performed in the following ways.

A method for implementing privacy protection in a blockchain includes the following: a client device encrypts a transaction including a smart contract, and sends the encrypted transaction to a first blockchain node, where code of the smart contract includes a contract state indicated by a privacy identifier; and the first blockchain node decrypts the code of the smart contract in the transaction, executes the code of the smart contract in a trusted execution environment, uses a key to encrypt the contract state indicated by the privacy identifier, and writes the encrypted contract state to a database.

A method for implementing privacy protection in a blockchain includes the following: a first blockchain node receives an encrypted transaction including a smart contract, where code of the smart contract includes a contract state indicated by a privacy identifier; the first blockchain node decrypts the code of the smart contract in the transaction; and the first blockchain node executes the decrypted code of the smart contract in a trusted execution environment, uses a key to encrypt the contract state indicated by the privacy identifier, and writes the encrypted contract state to a database.

A system for implementing privacy protection in a blockchain includes a client device and a first blockchain node, where the client device is configured to encrypt a transaction including a smart contract, and send the encrypted transaction to the first blockchain node, where code of the smart contract includes a contract state indicated by a privacy identifier; and the first blockchain node is configured to decrypt the code of the smart contract in the transaction, execute the code of the smart contract in a trusted execution environment, use a key to encrypt the contract state indicated by the privacy identifier, and write the encrypted contract state to a database.

A node for implementing privacy protection in a blockchain includes the following: a receiving module, configured to receive an encrypted transaction including a smart contract, where code of the smart contract includes a contract state indicated by a privacy identifier; a decryption module, configured to decrypt the code of the smart contract in the transaction; an execution module, configured to execute the decrypted code of the smart contract in a trusted execution environment; a writing module, configured to use a key to encrypt the contract state indicated by the privacy identifier, and write the encrypted contract state to a database after the execution module executes the decrypted code of the smart contract; and the database, configured to store the written contract state encrypted by using the key.

It can be seen from the previously described technical solutions provided in the embodiments of the present application that, the contract state indicated by the privacy identifier in the code of the smart contract can be encrypted and stored in the database in the embodiments of the present application. A contract state not indicated by the privacy identifier in the code of the smart contract can still be stored in plaintext in the database. The contract state indicated with privacy protection can be flexibly encrypted in the embodiments, compared with the existing technology that all contract states of the smart contract are considered as the data that needs privacy protection and that needs to be computed in the TEE, and all contract states are stored in the database.

BRIEF DESCRIPTION OF DRAWINGS

To describe technical solutions in embodiments of the present application or in the existing technology more clearly, the following briefly describes the accompanying drawings needed for describing the embodiments or the existing technology. Clearly, the accompanying drawings in the following descriptions merely show some embodiments of the present application, and a person of ordinary skill in the art can still derive other drawings from these accompanying drawings without creative efforts.

DESCRIPTION OF EMBODIMENTS

Embodiments of the present application provide methods for implementing privacy protection in a blockchain.

To make a person skilled in the art better understand the technical solutions in the present application, the following describes in detail the technical solutions in the embodiments of the present application with reference to the accompanying drawings in the embodiments of the present application. Clearly, the described embodiments are merely some but not all of the embodiments of the present application. All other embodiments obtained by a person of ordinary skill in the art based on the embodiments of the present application without creative efforts shall fall within the protection scope of the present application.

Blockchains are generally classified into three types: public blockchains (Public Blockchain), private blockchains (Private Blockchain), and consortium blockchains (Consortium Blockchain). In addition, there are combinations of a plurality of types, such as a combination of a private blockchain and a consortium blockchain, and a combination of a consortium blockchain and a public blockchain. The public blockchain has the highest degree of decentralization. Bitcoin and Ethereum are examples of public blockchains. Participants that join the public blockchain can read data records in the blockchain, participate in transactions, contend for ledger permission of a new block, etc. In addition, each participant (namely node) can freely join and exit the network and perform related operations. The private blockchain is an opposite of the public blockchain. Write permission of the network is controlled by an organization or an institution, and data read permission is specified by the organization. In short, the private blockchain can be a weakly centralized system, and has few participating nodes with strict restrictions. This type of blockchain is more suitable for internal use of specific institutions. The consortium blockchain varies from the public blockchain to the private blockchain, and can implement "partial decentralization". Each node in the consortium blockchain usually has a corresponding entity organization or institution. Participants are authorized to join the network and form a stakeholder alliance, and jointly maintain the operation of the blockchain.

Each of the public blockchain, the private blockchain, and the consortium blockchain can provide the function of smart contract. Smart contracts in the blockchain are contracts that can be triggered by transactions to be executed in the blockchain system. Smart contracts can be described in the form of code.

Ethereum is used as an example. Supporting users in creating and invoking some complex logic in the Ethereum network is the biggest challenge of Ethereum to be distinguished from the Bitcoin blockchain technology. Ethereum is a programmable blockchain, and the core of Ethereum is an Ethereum virtual machine (EVM). Each Ethereum node can run the EVM. The EVM is a Turing-complete virtual machine, which means that the EVM can implement various kinds of complex logic. Deploying and invoking smart contracts in Ethereum by users are implemented by the EVM. In fact, the virtual machine directly runs virtual machine code (virtual machine bytecode, referred to as "bytecode" below). Smart contracts deployed in the blockchain can be in the form of bytecode.

Figure 1:
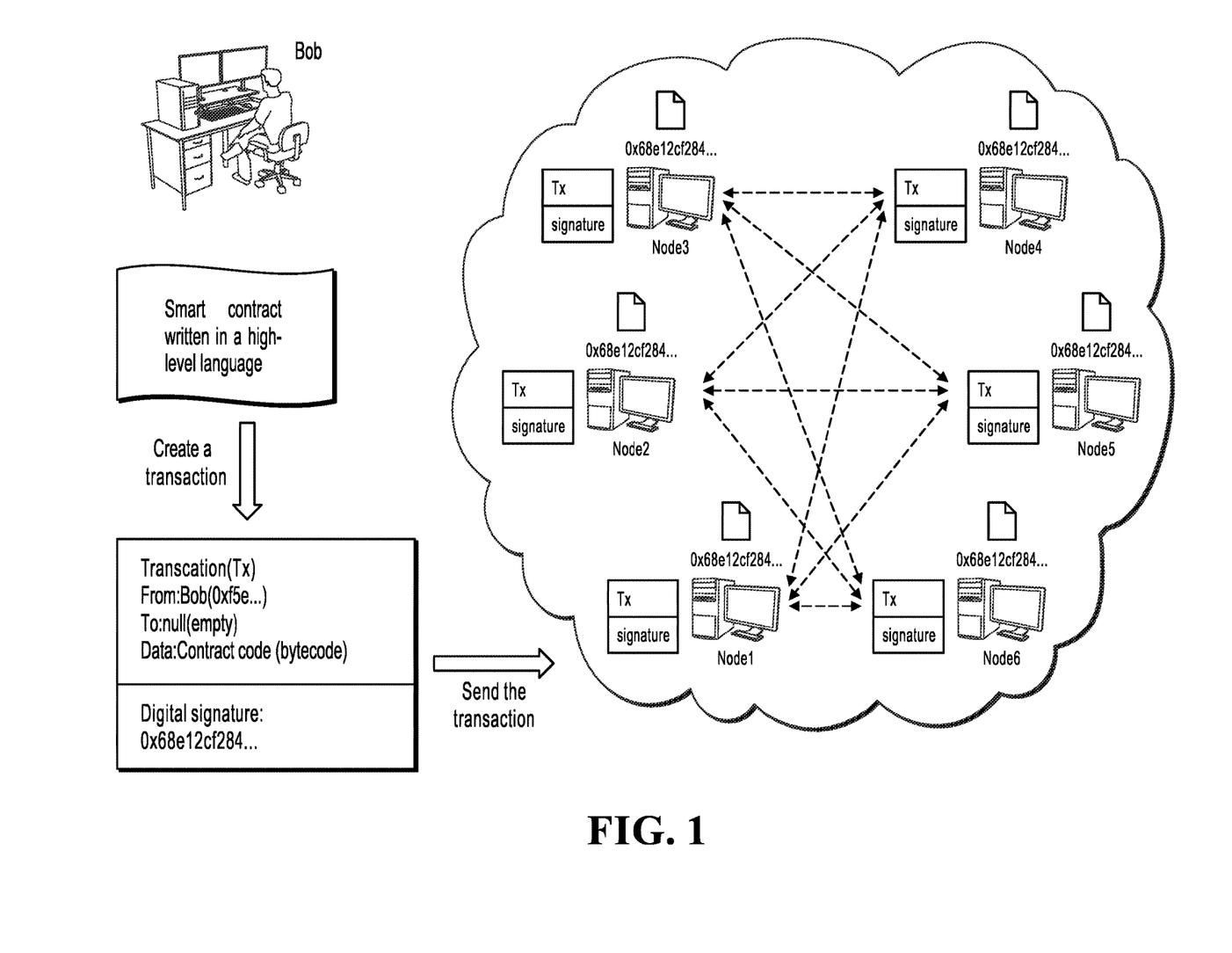
FIG. 1 is a diagram illustrating a process of creating a smart contract, according to some embodiments of the present application.

For example, as shown in FIG. 1, after Bob sends a transaction that includes information for creating a smart contract to the Ethereum network, an EVM of node 1 can execute the transaction and generate a corresponding contract instance. "0x68e12cf284 . . . " in FIG. 1 represents an address of the contract, a Data field of the transaction can store bytecode, and a To field of the transaction is an empty account. After nodes reach an agreement by using a consensus mechanism, the contract is successfully created, and users can invoke the contract subsequently.

After the contract is created, a contract account corresponding to the smart contract appears in the blockchain and has a specific address. Contract code and account storage are stored in the contract account. Behavior of the smart contract is controlled by the contract code, and the account storage of the smart contract keeps a contract state. In other words, the smart contract makes a virtual account including the contract code and the account storage (Storage) be generated in the blockchain.

As mentioned above, the Data field of the transaction that includes creating a smart contract can store the bytecode of the smart contract. The bytecode includes a series of bytes, and each byte can identify an operation. Considering the development efficiency, readability, etc., developers can choose a high-level language to write the smart contract code instead of writing bytecode directly. The smart contract code written in the high-level language is compiled by a compiler to generate bytecode, which can be deployed in the blockchain. Ethereum supports many high-level languages, such as Solidity, Serpent, and Lisp-Like Language (LLL).

Solidity is used as an example. Contracts written in Solidity are similar to classes (Class) in object-oriented programming languages. A plurality of members can be stated in a contract, including a state variable, a function, a function modifier, an event, etc. The state variable is a value that is permanently stored in the account storage of the smart contract, and is used to keep the contract state.

The following is code example 1 of a simple smart contract written in Solidity.

```
Contract Example{
int balance;
function C( ){
balance+=1;
}
function getblance( ) returns(int) {
return balance;
}
}
```

Generally, after the contract is deployed in the blockchain, a storage state corresponding to the state variable "balance" is plaintext, and anyone can see the state. There is no privacy protection setting or capability. If the user wants to implement privacy protection for the state, the user needs to rewrite the contract by using the zero-knowledge proof and homomorphic encryption solutions, so that the state variable "balance" is encrypted and protected. In addition, the whole operation of "balance" needs to be supported in an encryption domain. Generally, the operation of this type of encryption method is complex, and it is difficult to design a suitable algorithm to be supported in the encryption domain. In some solutions of combining the blockchain and a trusted execution environment (TEE), to implement privacy protection, all contract states of the smart contract are considered as the data that needs privacy protection and are stored in the blockchain. The blockchain is a data set that is stored in a database of the node and formed by specific logic. As described below, a physical carrier of the database can be a storage medium, such as a persistent storage medium. In fact, only the contract state "balance" in the smart contract may be sensitive and needs privacy protection, but the other content is not sensitive and can be made public.

Figure 2:
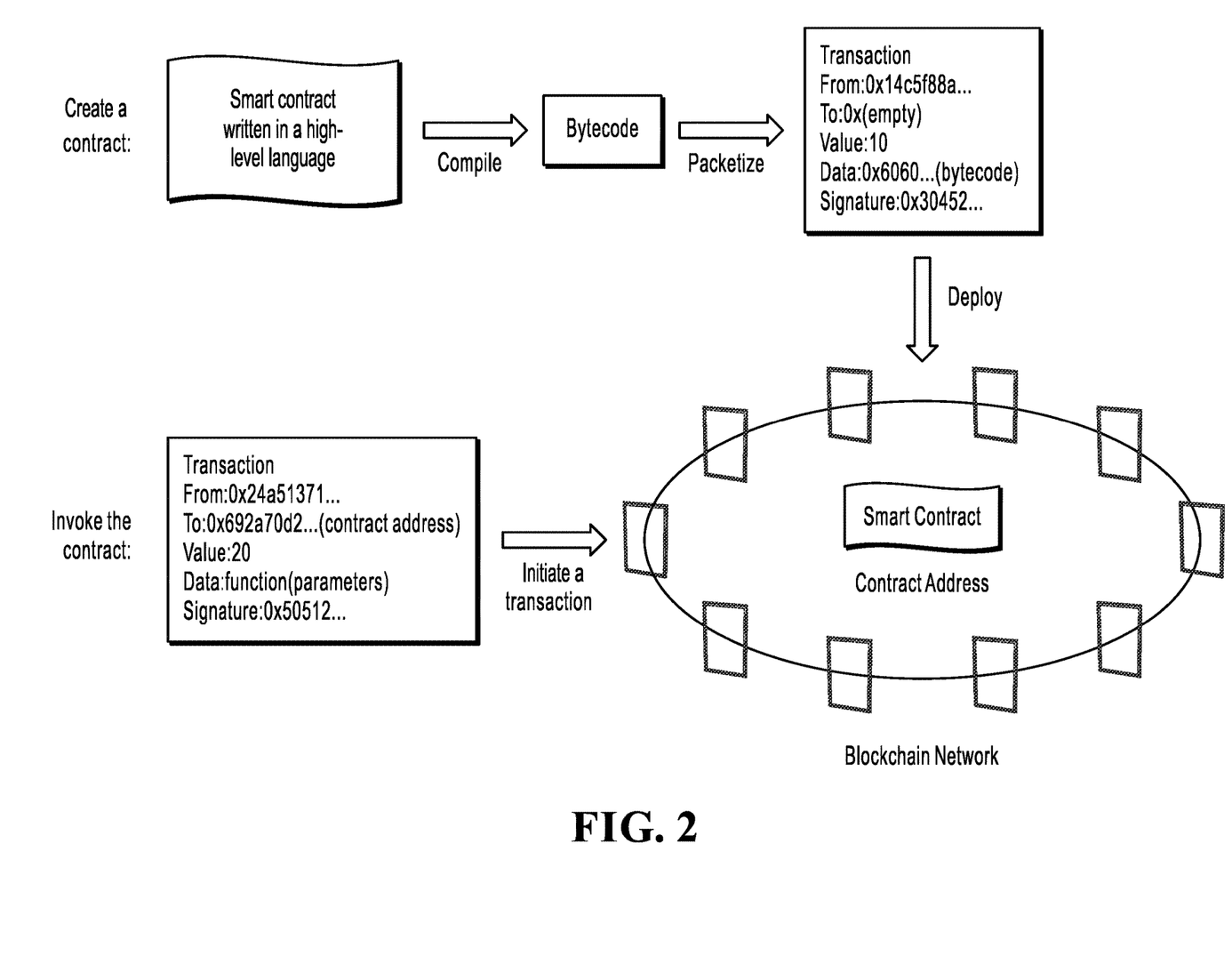
FIG. 2 is a diagram illustrating a process of invoking a smart contract, according to some embodiments of the present application.

In addition, still using Ethereum as an example, as shown in FIG. 2, after Bob sends a transaction that includes information for invoking the smart contract to the Ethereum network, the EVM of node 1 can execute the transaction and generate a corresponding contract instance. In FIG. 2, a From field of the transaction is an address of the account that initiates the invoking of the smart contract, "0x692a-70d2 . . . " in a To field represents an address of the invoked smart contract, a Value field represents a value of Ethercoin in Ethereum, and a Data field of the transaction stores methods and parameters for invoking the smart contract. After the smart contract is invoked, the value of "balance" may change. Subsequently, a certain client device can view the current value of "balance" by using a certain blockchain node (such as node 6 in FIG. 2).

The smart contract can be executed independently by each node in the blockchain network in a specified way, and all execution records and data are stored in the blockchain. Therefore, after the transaction is completed, a transaction certificate that cannot be tampered with or lost is stored in the blockchain.

Figure 3:
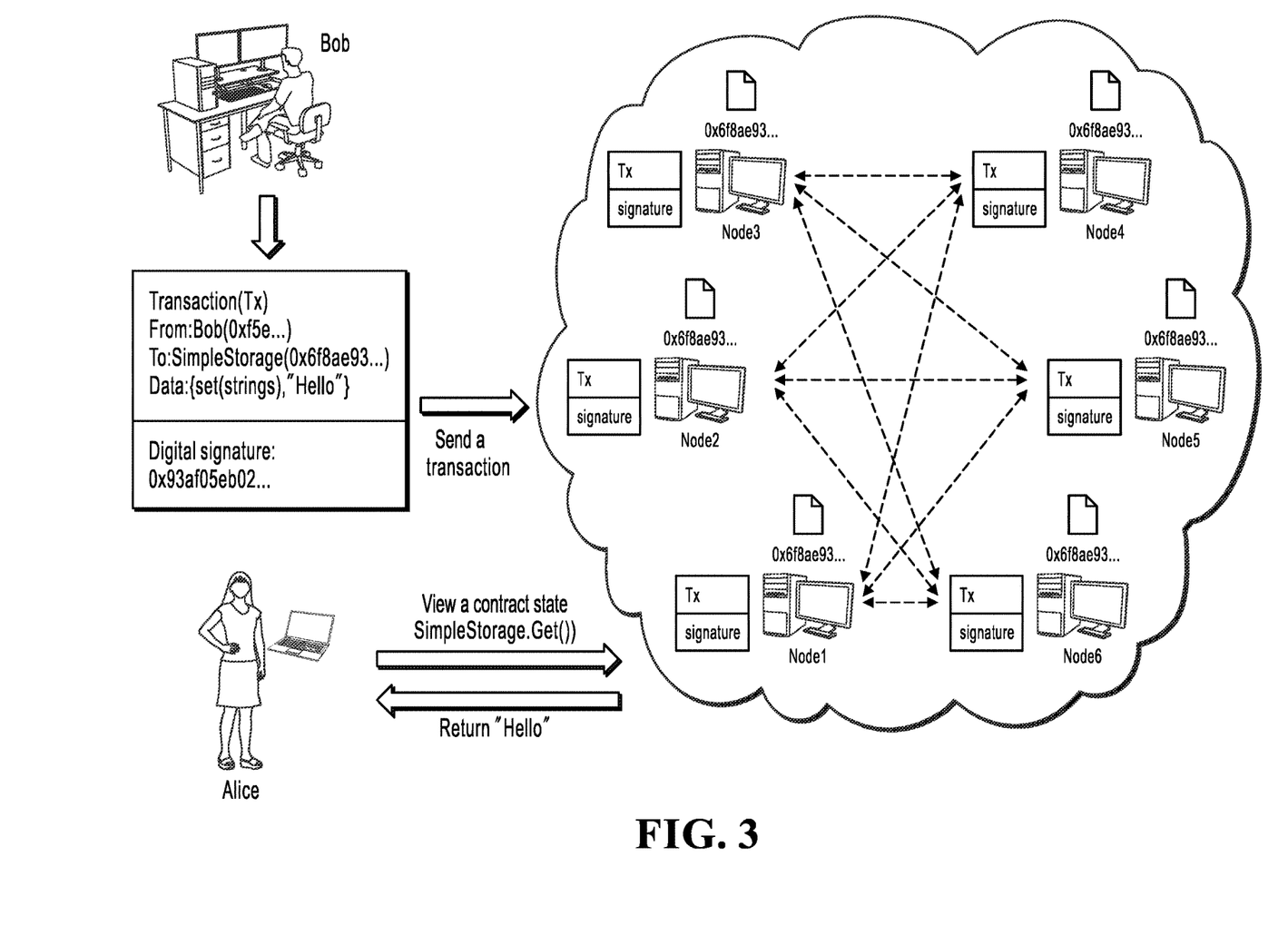
FIG. 3 is a diagram illustrating a process of creating a smart contract and invoking a smart contract, according to some embodiments of the present application.

FIG. 3 is a diagram illustrating a process of creating a smart contract and invoking a smart contract. Creating a smart contract in Ethereum includes processes such as writing the smart contract, changing the smart contract to bytecode, and deploying the bytecode in the blockchain. Invoking a smart contract in Ethereum is initiating a transaction to an address of the smart contract, and code of the smart contract runs in a distributed way in the virtual machine of each node in the Ethereum network.

Figure 4:
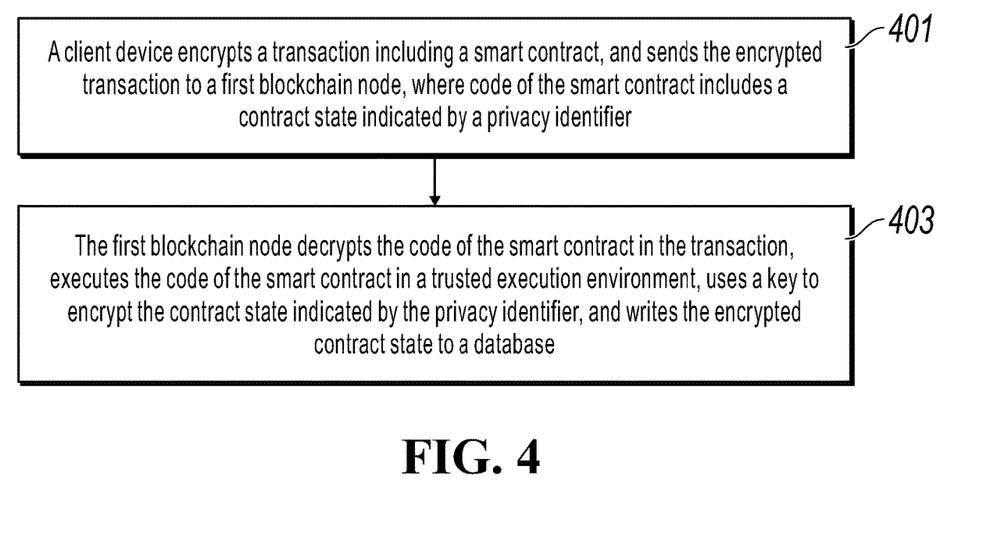
FIG. 4 is a flowchart illustrating method embodiments for implementing privacy protection, according to the present application.

With reference to FIG. 4, the following describes an implementation process of method embodiments for implementing privacy protection according to the present application.

S401: A client device encrypts a transaction including a smart contract, and sends the encrypted transaction to a first blockchain node, where code of the smart contract includes a contract state indicated by a privacy identifier.

In a process of writing the code of the smart contract on the client device, a user can use the privacy identifier to identify the contract state that needs privacy protection.

That the user uses Solidity to write "creating a smart contract" is used as an example. In a process of writing, the user can use a privacy identifier to identify a contract state that needs privacy protection. For example, the contract state here is a state variable in a programming language. Similarly, in a process of writing a smart contract in a language such as Serpent or LLL, a privacy identifier can also be used to identify a state variable that needs privacy protection.

At present, Solidity mainly supports the following state variable types: Booleans, Integers, Fixed Point Numbers, Address, Fixed-size byte array, Address Literals, Rational and integer Literals, String Literals, Hexadecimal Literals, and Enums.

The privacy identifier here can be an identifier that specially indicates the need for privacy protection, for example, is represented by the keyword "Confidential". Therefore, to implement privacy protection for the state variables supported by Solidity, the privacy identifier "Confidential" can be added in front of the state variables. In this way, the state variables that need privacy protection can be indicated by the prefix "Confidential". For example, Solidity can support the following state variable types that need privacy protection: Confidential Booleans, Confidential Integers, Confidential Fixed Point Numbers, Confidential Address, Confidential Fixed-size byte array, Confidential Address Literals, Confidential Rational and integer Literals, Confidential String Literals, Confidential Hexadecimal Literals, and Confidential Enums.

For code example 1 mentioned above, to implement privacy protection for "balance", the privacy identifier "Confidential" can be added in front of the type int that describes "balance" (certainly, the privacy identifier "Confidential" can alternatively be added after the type int that describes "balance"), as shown in code example 2 below (the underlined part represents the privacy identifier).

```
Contract Example{
Confidential int balance;
function C( ){
balance+=1;
}
function getblance( ) returns(int){
return balance;
}
}
```

The smart contract in the transaction received by the first blockchain node can be a smart contract written by the user in a high-level language directly on the first blockchain node, a received smart contract written by the user in a high-level language on the client device, or a smart contract in a transaction received from a second blockchain node.

Specifically, the smart contract can be a smart contract in a transaction sent by the client device by using the second blockchain node.

As described above, smart contracts deployed in the blockchain are generally in the form of bytecode. If the user writes the smart contract in the high-level language directly on the first blockchain node, the first blockchain node can further use a compiler to compile the smart contract written in the high-level language to generate bytecode. For the received smart contract written by the user in the high-level language on the client device, after the user writes the smart contract on the client device, the client device can further use a compiler to compile the smart contract written in the high-level language to generate bytecode, and then send the smart contract in the form of bytecode to the first blockchain node. In this way, the first blockchain node receives the smart contract in the form of bytecode. In addition, after the user writes the smart contract on the client device, the client device can directly send the smart contract written in the high-level language to the first blockchain node, and then the first blockchain node can use a compiler to compile the smart contract written in the high-level language to generate bytecode. The smart contract in the transaction received by the first blockchain node from the second blockchain node is generally a smart contract in the form of bytecode. Certainly, the smart contract can alternatively be a smart contract written in a high-level language, and in this case, the first blockchain node can use a compiler to compile the smart contract written in the high-level language to generate bytecode.

In a process of using the compiler to compile the smart contract written in the high-level language, the compiler needs to be adjusted to process the contract state indicated by the privacy identifier.

For the C( ) function part of the smart contract written in the conventional Solidity language in code example 1, a compilation result of the compiler is, for example, code example 3 shown below (the part . . . in /* . . . */ is an annotation).

/* compile function C( ) balance+=1*/
tag_2
/* pushes 1 onto stack, and this 1 is the value 1 to be assigned*/
0x1
/* pushes 0 onto stack, and this 0 refers to location 0 of the data storage of the contract account that the balance data is to be stored in. After the previous two lines are executed, the stack has two pieces of data 0 and 1 from top to bottom*/
0x0
/* a value obtained after balance is assigned to balance+1 in balance+=1*/
dup2 /*duplicates the second item from top to bottom in the stack, and therefore the stack has three pieces of data 1, 0, and 1 from top to bottom*/
swap1 /*interchanges two pieces of data at the top of the stack, and then the stack stores 0, 1, and 1 from top to bottom*/
/*store(0x0, 0x1), the second piece of data from top to bottom in the stack is stored in a location identified by the first piece of data, and then the two pieces of data are removed from the stack. That is, the data 1 is stored in location 0. Because balance has been bound to location 0, the assignment of balance=1 is completed. At this time, the stack has only one piece of data 1*/
sstore
pop /*discards the data at the top of the stack. At this time, the stack becomes empty and waits for the next instruction to execute*/

For the smart contract that is written in Solidity and that includes the contract state indicated by the privacy identifier in code example 2, a compilation result of the compiler is code example 4 shown below (the part . . . in /* . . . */ is an annotation).

/* compile function C( ) balance+=1*/
tag_2
/* pushes 1 onto stack, and this 1 is the value 1 to be assigned*/
0x1
/* pushes 0 onto stack, and this 0 refers to location 0 of the data storage of the contract account that the balance data is to be stored in. After the previous two lines are executed, the stack has two pieces of data 0 and 1 from top to bottom*/0x0
/* a value obtained after balance is assigned to balance+1 in balance+=1*/
dup2 /*duplicates the second item from top to bottom in the stack, and therefore the stack has three pieces of data 1, 0, and 1 from top to bottom*/
swap1 /*interchanges two pieces of data at the top of the stack, and then the stack stores 0, 1, and 1 from top to bottom*/
/* Confidential_sstore(0x0, 0x1), the second piece of data from top to bottom in the stack is stored in a location identified by the first piece of data, and then the two pieces of data are removed from the stack. That is, the data 1 is stored in location 0. Because balance has been bound to location 0, the assignment of balance=1 is completed. At this time, the stack has only one piece of data 1*/
Confidential_sstore
pop /*discards the data at the top of the stack. At this time, the stack becomes empty and waits for the next instruction to execute*/

In the previously described bytecode, the contract state "balance" that needs privacy protection is indicated by the privacy identifier "Confidential".

In the bytecode here, the keyword "Confidential" is also used to indicate an operation that needs privacy protection, and is the same as the privacy identifier in the smart contract written in Solidity, that is, the same as the privacy identifier in code example 2. A person skilled in the art understands that a privacy identifier different from the privacy identifier in code example 2 can be used in the bytecode, that is, a privacy identifier different from the privacy identifier in the code written in the high-level language can be used in the bytecode. Even if a privacy identifier different from the privacy identifier in the code written in the high-level language is used in the bytecode, assuming that the privacy identifier in the code written in the high-level language is a first privacy identifier and the privacy identifier in the code in the form of bytecode is a second privacy identifier, the first privacy identifier has a mapping relationship with the second privacy identifier.

As described above, if the user writes the smart contract in the high-level language directly on the first blockchain node, that is, the smart contract in the transaction that includes the smart contract and that is received by the first blockchain node is written in the high-level language, the first blockchain node can further use a compiler to compile the smart contract written in the high-level language to generate bytecode. In the generated smart contract in the form of bytecode, the contract state that needs privacy protection is indicated by a privacy identifier in the code of the smart contract. The smart contract written in the high-level language includes the contract state that needs privacy protection and that is indicated by the privacy identifier. The privacy identifier in the code written in the high-level language corresponds to the privacy identifier in the code in the form of bytecode.

If the user writes the smart contract in the high-level language on the client device, after the user writes the smart contract on the client device, the client device can further use a compiler to compile the smart contract written in the high-level language to generate bytecode, and then send the smart contract in the form of bytecode to the first blockchain node. In this way, the first blockchain node receives the transaction including the smart contract, where the smart contract is the smart contract in the form of bytecode. The smart contract in the form of bytecode includes the contract state that needs privacy protection and that is indicated by a privacy identifier. The smart contract written in the high-level language includes the contract state that needs privacy protection and that is indicated by the privacy identifier. The privacy identifier in the code written in the high-level language corresponds to the privacy identifier in the code in the form of bytecode.

In addition, after the user writes the smart contract on the client device, the client device can directly send the smart contract written in the high-level language to the first blockchain node. The smart contract written in the high-level language includes the contract state that needs privacy protection and that is indicated by the privacy identifier. Then, the first blockchain node can use a compiler to compile the smart contract written in the high-level language to generate bytecode. In the generated smart contract in the form of bytecode, the contract state that needs privacy protection is indicated by a privacy identifier in the code of the smart contract. The privacy identifier in the code written in the high-level language corresponds to the privacy identifier in the code in the form of bytecode.

As described above, the smart contract in the transaction received by the first blockchain node from the second blockchain node is generally a smart contract in the form of bytecode. Certainly, the smart contract can alternatively be a smart contract written in a high-level language. The first blockchain node can further compile the smart contract written in the high-level language to generate bytecode. Similarly, the privacy identifier in the code written in the high-level language corresponds to the privacy identifier in the code in the form of bytecode.

The client device can use a key to encrypt the transaction that includes creating a smart contract. The encryption can use symmetric encryption or asymmetric encryption. Encryption algorithms for symmetric encryption are, for example, the Data Encryption Standard (DES) algorithm, the Triple DES (3DES) algorithm, the Triple Data Encryption Algorithm (TDEA), the Blowfish algorithm, the RC5 algorithm, and the International Data Encryption Algorithm (IDEA). Encryption algorithms for asymmetric encryption are, for example, the Rivest-Shamir-Adleman (RSA) algorithm, the ElGamal algorithm, the Knapsack algorithm, the Rabin algorithm, the Diffie-Hellman (D-H) algorithm, and the Elliptic Curve Cryptography (ECC) algorithm.

Alternatively, the client device can use a combination of a symmetric encryption method and an asymmetric encryption method to encrypt the transaction that includes creating a smart contract. For example, the client device uses a symmetric encryption algorithm to encrypt the transaction content, that is, uses a private key of the symmetric encryption algorithm to encrypt the transaction that includes creating a smart contract, and the client device uses an asymmetric encryption algorithm to encrypt the private key used in the symmetric encryption algorithm. Generally, a public key of the asymmetric encryption algorithm is used to encrypt the private key used in the symmetric encryption algorithm. In this way, after receiving the encrypted transaction, the first blockchain node can first use a private key of the asymmetric encryption algorithm to perform decryption to obtain the private key of the symmetric encryption algorithm, and then use the private key of the symmetric encryption algorithm to perform decryption to obtain the transaction content, that is, code of creating a smart contract.

The first blockchain node receives the transaction including the smart contract, where the code of the smart contract includes the contract state that needs privacy protection and that is indicated by the privacy identifier.

The transaction sent by the client device to the first blockchain node can also be a transaction that includes invoking a smart contract. In this case, the client device can use a key to encrypt the transaction that includes invoking a smart contract, and send the encrypted transaction to the first blockchain node. The invoked smart contract can include a contract state indicated by a privacy identifier. The transaction for invoking a smart contract can be multi-nested invoking. For example, code in invoked smart contract 1 invokes smart contract 2, and code in invoked smart contract 2 directs to contract address 3 generated when smart contract code is created. Therefore, invoking the code in smart contract 1 indirectly invokes the smart contract code in contract address 3, and the code in contract address 3 can include a contract state indicated by a privacy identifier. In this way, invoked smart contract 1 includes the contract state indicated by the privacy identifier. A specific implementation process is similar to the previously described process, and details are omitted here for simplicity.

The transaction sent by the client device to the first blockchain node can also be a transaction that includes creating and invoking a smart contract. In this case, the client device can use a key to encrypt the transaction that includes creating and invoking a smart contract, and send the encrypted transaction to the first blockchain node, where the smart contract includes a contract state indicated by a privacy identifier. A specific implementation process is similar to the previously described process, and details are omitted here for simplicity.

S403: The first blockchain node decrypts the code of the smart contract in the transaction, executes the code of the smart contract in a trusted execution environment, uses a key to encrypt the contract state indicated by the privacy identifier, and writes the encrypted contract state to a database.

As described above, the transaction that includes the smart contract and that is received by the first blockchain node can be, for example, a transaction for creating and/or invoking a smart contract. For example, in Ethereum, after receiving the transaction for creating and/or invoking a smart contract from the client device, the first blockchain node can check whether the transaction is valid and whether the format is correct, verify whether a signature of the transaction is valid, etc.

Generally, nodes in Ethereum are nodes contending for ledger permission. Therefore, as a node contending for the ledger permission, the first blockchain node can locally execute the transaction including the smart contract. If one of the nodes contending for the ledger permission wins in the process of contending for the ledger permission, the node becomes a ledger node. If the first blockchain node wins in the process of contending for the ledger permission, the first blockchain node becomes the ledger node. Certainly, if the first blockchain node does not win in the process of contending for the ledger permission, the first blockchain node is not the ledger node, and another node may become the ledger node.

Smart contracts are similar to classes in object-oriented programming. Contract instances corresponding to the smart contracts are generated in execution results, and are similar to generated objects corresponding to the classes. In a process of executing the code of creating a smart contract in the transaction, a contract account is created, and a contract is deployed in the account space. In Ethereum, an address of the smart contract account is generated based on an encryption algorithm by using a sender address (such as 0xf5e . . . in FIG. 1 or 0x14c5f88a . . . in FIG. 2) and a random number (nonce) of the transaction as input. The contract address in FIG. 2 is generated based on an encryption algorithm by using the sender address 0x14c5f88a . . . and nonce of the transaction.

Generally, in blockchain networks that support smart contracts and that use consensus algorithms such as Proof of Work (PoW), Proof of Stake (PoS), and Delegated Proof of Stake (DPoS), after receiving transactions that include creating a smart contract, nodes contending for the ledger permission can execute the transactions. One of the nodes contending for the ledger permission may win in the process of contending for the ledger permission, and then become a ledger node. The ledger node can packetize the transaction including the smart contract with other transactions to generate a new block, and send the generated new block to other nodes for consensus.

In blockchain networks that support smart contracts and that use algorithms such as Practical Byzantine Fault Tolerance (PBFT), nodes with the ledger permission are determined through negotiation in advance. Therefore, if the first blockchain node is not the ledger node, after receiving a transaction for creating a smart contract, the first blockchain node can send the transaction to the ledger node. When or before packetizing the transaction including the smart contract to generate a new block, or when or before packetizing the transaction including the smart contract with other transactions to generate a new block, the ledger node (which can be the first blockchain node) can execute the transaction including the smart contract. After packetizing the transaction including the smart contract (or packetizing the transaction including the smart contract with other transactions) to generate the new block, the ledger node sends the generated new block or block header to other nodes for consensus.

As described above, in blockchain networks that support smart contracts and that use the PoW algorithm, or in blockchain networks that support smart contracts and that use the PoS, DPoS, and PBFT algorithms, the ledger node can packetize the transaction including the smart contract to generate a new block, and send the generated new block or block header to other nodes for consensus. If the block passes the verification performed by the other nodes that receive the block, the new block can be added to the end of the original blockchain, to complete the bookkeeping process and achieve consensus. In this case, the deployment of the smart contract in the blockchain network is completed. When the other nodes are verifying the new block or block header sent by the ledger node, the transaction including the smart contract in the block can be executed.

Generally, the execution process can be performed by a virtual machine, such as an EVM in Ethereum. Generally, the EVM executes smart contracts in the form of bytecode. When executing sstore in code example 3, the EVM writes the contract state to the database in a conventional key-value pair (key-value pair) method. The corresponding code is, for example, setstorage(key, value).

In some embodiments, the first blockchain node can execute the decrypted smart contract code in a TEE. The TEE is a trusted execution environment that is securely extended based on CPU hardware isolated from the outside. The TEE is first proposed by the Global Platform to securely isolate resources on mobile devices and provide trusted and secure execution environments parallel to the operating system for applications. A real commercial TEE technology is first implemented in the TrustZone technology of ARM.

As the Internet develops rapidly, the demand for security is increasing. Mobile devices, cloud devices, and even data centers place more demands on the TEE. The concept of TEE is also rapidly developed and expanded. Compared with the original concept, the TEE is more generalized. For example, server chip manufacturers such as Intel and AMD have successively launched hardware-assisted TEE, which enriches the concept and features of the TEE and has been widely recognized in the industry. At present, the TEE usually refers to this kind of hardware-assisted TEE technology. Different from mobile terminals, cloud access needs remote access, and the hardware platform is invisible to end users. Therefore, the first step in using the TEE is to confirm the authenticity of the TEE. Therefore, a remote attestation mechanism is introduced in the TEE technology. Hardware manufacturers (which are mainly CPU manufacturers) endorse the TEE, and use a digital signature technology to ensure that the users can verify the TEE state. In addition, merely secure resource isolation cannot meet the security demands, and data privacy protection is further proposed. Commercial TEEs including Intel software guard extensions (SGX) and AMD secure encrypted virtualization (SEV) provide memory encryption technologies. Trusted hardware is confined in CPUs, and the data of buses and memories are ciphertext to avoid snooping by malicious users. For example, in TEE technologies such as Intel SGX, code execution, remote attestation, security configuration, secure storage of data, and trusted paths for code execution are isolated. Security protection is implemented for applications running in the TEE, and the applications are almost impossible to be accessed by a third party.

The Intel SGX technology is used as an example. The SGX provides an enclave, that is, an encrypted trusted execution area in the memory, and the CPU prevents data from being stolen. That the first blockchain node uses a CPU supporting SGX is used as an example. A new processor instruction can be used to allocate an enclave page cache (EPC) in the memory, and the data in the EPC is encrypted by using a memory encryption engine (MEE) in the CPU. The encrypted content in the EPC is decrypted to plaintext only after entering the CPU. Therefore, in the SGX, users can distrust the operating system, the virtual machine monitor (VMM), or even the basic input/output system (BIOS), and only need to trust the CPU to ensure that the privacy data is not divulged. In practice, the privacy data can be encrypted and transmitted to the enclave in the form of ciphertext, and a corresponding key is also transmitted to the enclave through remote attestation. Afterwards, the data is used for operation under the encryption protection of the CPU, and results are returned in the form of ciphertext. In this way, powerful computing power can be used, and there is no need to worry about data leakage.

As described in S401, the client device can use a key to encrypt the transaction that includes creating a smart contract. The encryption can use symmetric encryption or asymmetric encryption. In S403, correspondingly, the first blockchain node can use a corresponding key to decrypt the code of the smart contract in the transaction. If the client device uses a symmetric encryption method, that is, a private key for symmetric encryption, to encrypt the transaction for creating a smart contract in S401, correspondingly, in S403, the first blockchain node can use the private key for symmetric encryption to decrypt the code of the smart contract in the transaction. Encryption algorithms for symmetric encryption are, for example, the DES algorithm, the 3DES algorithm, the TDEA, the Blowfish algorithm, the RC5 algorithm, and the IDEA. The key for symmetric encryption can be, for example, determined through negotiation between the client device and the first blockchain node.

If the client device uses an asymmetric encryption method, that is, a public key for asymmetric encryption, to encrypt the transaction for creating a smart contract in S401, correspondingly, in S403, the first blockchain node can use a private key for asymmetric encryption to decrypt the code of the smart contract in the transaction. Encryption algorithms for asymmetric encryption are, for example, the RSA algorithm, the ElGamal algorithm, the Knapsack algorithm, the Rabin algorithm, the D-H algorithm, and the Elliptic Curve Cryptography (ECC) algorithm. The keys for asymmetric encryption can be, for example, a pair of public key and private key generated by the first blockchain node. The public key is sent to the client device before S401, so that in S401, the client device can use the key to encrypt the transaction that includes creating a smart contract.

The keys for asymmetric encryption can alternatively be generated by a key management server. Through remote attestation, the key management server sends the private key to the first blockchain node, and specifically to an enclave of the first blockchain node. The public key for asymmetric encryption can be sent by the key management server to the client device. In this way, in S401, the client device can use the public key to encrypt the transaction that includes creating a smart contract. Correspondingly, the first blockchain node can use the private key to decrypt the code of the smart contract in the transaction.

As described in S401, the client device can also use a combination of a symmetric encryption method and an asymmetric encryption method. For example, the client device uses a symmetric encryption algorithm to encrypt the transaction content, that is, uses a private key of the symmetric encryption algorithm to encrypt the transaction that includes creating a smart contract, and the client device uses an asymmetric encryption algorithm to encrypt the private key used in the symmetric encryption algorithm. Generally, a public key of the asymmetric encryption algorithm is used to encrypt the private key used in the symmetric encryption algorithm. In this way, after receiving the encrypted transaction, the first blockchain node can first use a private key of the asymmetric encryption algorithm to perform decryption to obtain the private key of the symmetric encryption algorithm, and then use the private key of the symmetric encryption algorithm to perform decryption to obtain the transaction content, that is, code of creating a smart contract.

For example, through remote attestation, the key management server can send the private key of the asymmetric encryption algorithm to the enclave of the first blockchain node and send the public key of the asymmetric encryption algorithm to the client device. In this way, in S401, the client device can use the private key of the symmetric encryption algorithm to encrypt the transaction content, that is, use the private key of the symmetric encryption algorithm to encrypt the transaction that includes creating a smart contract, and the client device can use the public key of the asymmetric encryption algorithm to encrypt the private key used in the symmetric encryption algorithm. Therefore, the client device can send the encrypted transaction content and the private key that is used in the symmetric encryption algorithm and encrypted by using the public key of the asymmetric encryption algorithm to the first blockchain node. After receiving the encrypted transaction content and the private key that is used in the symmetric encryption algorithm and encrypted by using the public key of the asymmetric encryption algorithm, the first blockchain node can first use the private key of the asymmetric encryption algorithm to perform decryption to obtain the private key of the symmetric encryption algorithm, and then use the private key of the symmetric encryption algorithm to decrypt the transaction to obtain the transaction plaintext, so as to obtain the code plaintext of creating a smart contract. The encryption method here is generally called digital envelope encryption. The case of invoking a smart contract is similar to the case of creating a smart contract, and details are omitted here for simplicity.

In this way, the first blockchain node can execute the code of the smart contract in plaintext in the trusted execution environment. Specifically, the first blockchain node can use a new processor instruction in the CPU to allocate an EPC in the memory, use the MEE in the CPU to encrypt the decrypted plaintext code, and store the encrypted code in the EPC. The encrypted content in the EPC is decrypted to plaintext after entering the CPU. The CPU operates on the plaintext code, to complete the execution process.

In the SGX technology, the EVM can be loaded onto the enclave to execute the code of the smart contract. In the process of remote attestation, the key management server can calculate a hash value of local EVM code, compare the hash value of the local EVM code with a hash value of the EVM code loaded onto the first blockchain node, and use the validity of a comparison result as a necessary condition to pass remote attestation, so as to measure the code loaded onto the SGX enclave of the first blockchain node. After the measurement, the correct EVM can execute the smart contract code in the SGX.

Generally, the contract state changes after the CPU executes the plaintext code. After the plaintext code of the smart contract is executed in the trusted execution environment, the contract state indicated by the privacy identifier in the smart contract also changes.

From the perspective of blockchain nodes, storing the contract state in the blockchain is writing the contract state to a database, for example, a local database. The database is generally stored in a storage medium, and more commonly in a persistent storage medium. The persistent storage medium can be a disk, a floppy disk, or a memory etc. that can implement persistent storage by recovering data after being powered on.

The code of the database write operation is, for example, setstorage (key, ENC (value, secret_key)). In setstorage (key, ENC (value, secret_key)), the key (key) can be written in the same way as conventional keys. The value can be written by using the Intel SGX technology. ENC represents the enclave, and secret_key represents the key used in the database write operation in the SGX technology. The key can be a key for symmetric encryption, for example, a Simple Encrypted Arithmetic Library (SEAL) key. The SEAL key can be, for example, sent by the key management server to the first blockchain node after remote attestation is passed. In addition, the key can alternatively be a key for asymmetric encryption.

In this way, the contract state indicated by the privacy identifier in the code of the smart contract can be encrypted and stored in the database. A contract state not indicated by the privacy identifier in the code of the smart contract can still be stored in plaintext in the database. The contract state indicated with privacy protection can be flexibly encrypted and stored in the embodiments, compared with the existing technology that all contract states of the smart contract are considered as the data that needs privacy protection and that needs to be computed in the TEE, and all contract states are stored in the database.

Figure 5:
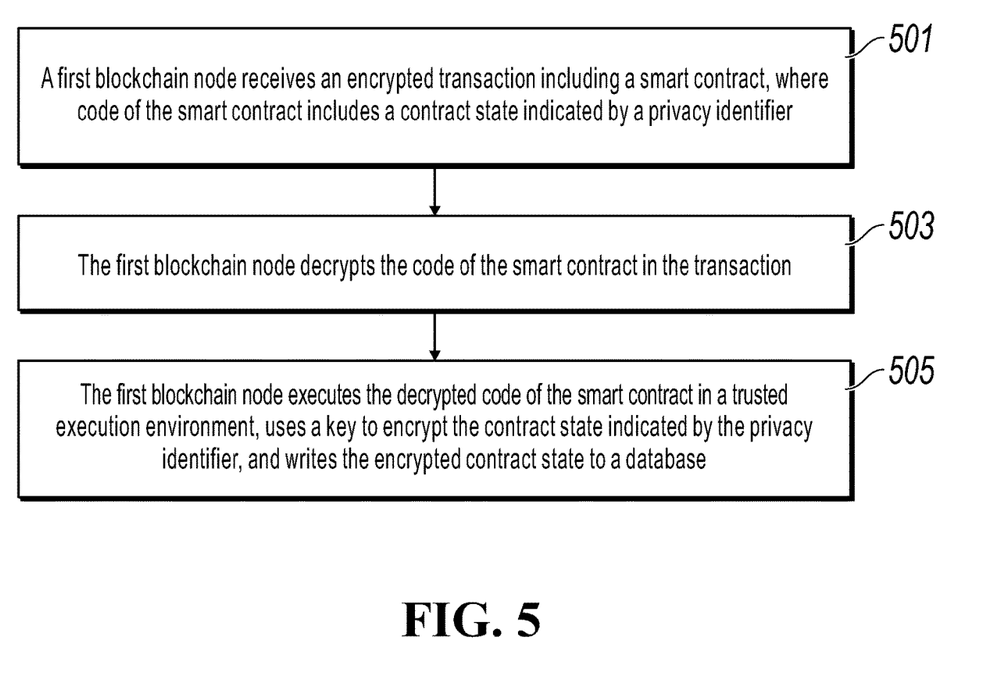
FIG. 5 is a flowchart illustrating method embodiments for implementing privacy protection, according to the present application.

FIG. 5 illustrates method embodiments for implementing privacy protection according to the present application. The embodiments focus on describing an implementation process from the perspective of a first blockchain node. As shown in FIG. 5, the method embodiments include the following steps.

S501: The first blockchain node receives an encrypted transaction including a smart contract, where code of the smart contract includes a contract state indicated by a privacy identifier.

As described above, the contract state can include a state variable in the code written in a programming language. That the user uses Solidity to write "creating a smart contract" is used as an example. In a process of writing, the user can use a privacy identifier to identify a contract state that needs privacy protection. For example, the contract state here is the state variable in the programming language. The privacy identifier here can be an identifier that specially indicates the need for privacy protection, for example, is represented by the keyword "Confidential". Therefore, to implement privacy protection for the state variables supported by Solidity, the privacy identifier "Confidential" can be added in front of the state variables. In this way, the state variables that need privacy protection can be indicated by the prefix "Confidential".

The smart contract in the transaction received by the first blockchain node can include the following: a smart contract written by a user in a high-level language on the first blockchain node; a smart contract written by a user in a high-level language on a client device; or a smart contract in a transaction sent by a second blockchain node.

As described above, smart contracts deployed in the blockchain are generally in the form of bytecode. If the user writes the smart contract in the high-level language directly on the first blockchain node, the first blockchain node can further use a compiler to compile the smart contract written in the high-level language to generate bytecode. For the received smart contract written by the user in the high-level language on the client device, after the user writes the smart contract on the client device, the client device can further use a compiler to compile the smart contract written in the high-level language to generate bytecode, and then send the smart contract in the form of bytecode to the first blockchain node. In this way, the first blockchain node receives the smart contract in the form of bytecode. In addition, after the user writes the smart contract on the client device, the client device can directly send the smart contract written in the high-level language to the first blockchain node, and then the first blockchain node can use a compiler to compile the smart contract written in the high-level language to generate bytecode. The smart contract in the transaction received by the first blockchain node from the second blockchain node is generally a smart contract in the form of bytecode. Certainly, the smart contract can alternatively be a smart contract written in a high-level language, and in this case, the first blockchain node can use a compiler to compile the smart contract written in the high-level language to generate bytecode.

In a process of using the compiler to compile the smart contract written in the high-level language, the compiler needs to be adjusted to process the contract state indicated by the privacy identifier. For details, refer to the embodiments corresponding to FIG. 4. As described in code examples 3 and 4, in the compiled bytecode here, the keyword "Confidential" is also used to indicate an operation that needs privacy protection, and is the same as the privacy identifier in the smart contract written in Solidity, that is, the same as the privacy identifier in code example 2. A person skilled in the art understands that a privacy identifier different from the privacy identifier in code example 2 can be used in the bytecode, that is, a privacy identifier different from the privacy identifier in the code written in the high-level language can be used in the bytecode. Even if a privacy identifier different from the privacy identifier in the code written in the high-level language is used in the bytecode, assuming that the privacy identifier in the code written in the high-level language is a first privacy identifier and the privacy identifier in the code in the form of bytecode is a second privacy identifier, the first privacy identifier has a mapping relationship with the second privacy identifier.

For the encrypted transaction that includes the smart contract and that is received by the first blockchain node, the encryption uses a symmetric encryption method, an asymmetric encryption method, or a combination of a symmetric encryption method and an asymmetric encryption method. For example, the client device can use a key to encrypt the transaction that includes creating a smart contract. The encryption can use symmetric encryption or asymmetric encryption. The client device can alternatively use a combination of a symmetric encryption method and an asymmetric encryption method. A private key for symmetric encryption is used to encrypt the transaction including the smart contract, and the first blockchain node uses the corresponding private key for symmetric encryption to decrypt the transaction to obtain the code of the smart contract; or a public key for asymmetric encryption is used to encrypt the transaction including the smart contract, and the first blockchain node uses a corresponding private key for asymmetric encryption to decrypt the transaction to obtain the code of the smart contract. The combination of a symmetric encryption method and an asymmetric encryption method includes a digital envelope encryption method.

A private key of a symmetric encryption algorithm is used to encrypt the transaction including the smart contract, and a public key of an asymmetric encryption algorithm is used to encrypt the private key used in the symmetric encryption algorithm; and the first blockchain node can use a private key of the asymmetric encryption algorithm to perform decryption to obtain the private key of the symmetric encryption algorithm, and use the private key of the symmetric encryption algorithm to perform decryption to obtain the transaction content. A public key of the symmetric encryption algorithm is obtained through negotiation between an encryptor and the first blockchain node, or obtained from a key management server. The public key of the symmetric encryption algorithm can alternatively be generated by the encryptor, and through remote attestation, the key management server sends the private key of the asymmetric encryption algorithm to an enclave of the first blockchain node and sends the public key of the asymmetric encryption algorithm to the encryptor.

The transaction that includes the smart contract and that is received by the first blockchain node can be, for example, a transaction for creating and/or invoking a smart contract.

S503: The first blockchain node decrypts the code of the smart contract in the transaction.

The decryption process is described above, and details are omitted here for simplicity.

S505: The first blockchain node executes the decrypted code of the smart contract in a trusted execution environment, uses a key to encrypt the contract state indicated by the privacy identifier, and writes the encrypted contract state to a database.

The first blockchain node can use a new processor instruction in the CPU to allocate an EPC in the memory, use the MEE in the CPU to encrypt the decrypted plaintext code, and store the encrypted code in the EPC. The encrypted content in the EPC is decrypted to plaintext after entering the CPU. The CPU operates on the plaintext code, to complete the execution process.

In the SGX technology, the EVM can be loaded onto the enclave to execute the code of the smart contract. In the process of remote attestation, the key management server can calculate a hash value of local EVM code, compare the hash value of the local EVM code with a hash value of the EVM code loaded onto the first blockchain node, and use the validity of a comparison result as a necessary condition to pass remote attestation, so as to measure the code loaded onto the SGX enclave of the first blockchain node. After the measurement, the correct EVM can execute the smart contract code in the SGX.

Generally, the contract state changes after the CPU executes the plaintext code. After the plaintext code of the smart contract is executed in the trusted execution environment, the contract state indicated by the privacy identifier in the smart contract also changes.

From the perspective of blockchain nodes, the contract state is written to a database, for example, a local database. The database is generally stored in a storage medium, and more commonly in a persistent storage medium. The persistent storage medium can be a disk, a floppy disk, or a memory etc. that can implement persistent storage by recovering data after being powered on.

The key includes a key for symmetric encryption or a key for asymmetric encryption. The key for symmetric encryption includes a SEAL key. The SEAL key can be sent by the key management server after the SGX of the first blockchain node passes remote attestation.

The compilers mentioned in the previously described embodiments are applicable to compiled languages. That is, before the code is executed, the compiler needs to convert the language (programming language) that human can understand in the code into the language that machines can understand. Then, the compiled code is executed by a virtual machine, such as the previously described EVM. Applications written in compiled languages can run directly after compilation. The compiled languages feature high running speeds and high efficiency.

In addition, there are interpreted languages. The interpreted languages are also languages (programming languages) that human can understand, and also need to be converted into languages that machines can understand for execution. However, the conversion is performed during the running. In other words, the interpreted languages are directly in the form of source code, which is parsed into machine code and executed in real time. Programs written in interpreted languages do not need to be compiled before running, but are translated during the running. Special interpreters are responsible for interpreting program code when each statement is executed. In this way, the interpreted languages need to be translated every time a statement is executed, which is inefficient. For example, JavaScript is an interpreted language, which means that the system does not know whether there is an error in each piece of code until the code runs. In other words, because the compiled languages are compiled before running, the compiler checks all code so that there are no low-level errors such as nonexistent names or wrong names. However, these problems may occur in JavaScript.

In the previously described embodiments, the compiled languages can be replaced by interpreted languages. That is, the smart contract code received by the first blockchain node can be written in an interpreted language and does not need to be compiled by the compiler. During execution, the interpreter can execute the smart contract code. The interpreter is, for example, a Just-In-Time (JIT) compilation of a Java virtual machine (JVM).

Similarly, in the SGX technology, the JVM can be loaded onto the enclave to execute the code of the smart contract. In the process of remote attestation, the key management server can calculate a hash value of local JVM code, compare the hash value of the local JVM code with a hash value of the JVM code loaded onto the first blockchain node, and use the validity of a comparison result as a necessary condition to pass remote attestation, so as to measure the code loaded onto the SGX enclave of the first blockchain node. After the measurement, the correct JVM can execute the smart contract code in the SGX.

Figure 6:
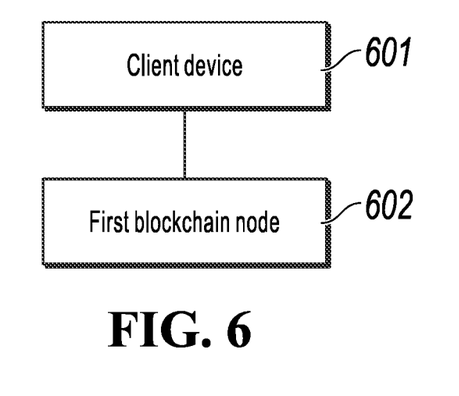
FIG. 6 is a diagram illustrating composition of system embodiments for implementing privacy protection, according to the present application.

With reference to FIG. 6, the following describes system embodiments for implementing privacy protection in a blockchain according to the present application. In some embodiments, the system for implementing privacy protection includes a client device 601 and a first blockchain node 602.

The client device 601 is configured to encrypt a transaction including a smart contract, and send the encrypted transaction to the first blockchain node, where code of the smart contract includes a contract state indicated by a privacy identifier.

The first blockchain node 602 is configured to decrypt the code of the smart contract in the transaction, execute the code of the smart contract in a trusted execution environment, use a key to encrypt the contract state indicated by the privacy identifier, and write the encrypted contract state to a database.

The contract state includes a state variable in the code written in a programming language.

A smart contract in the form of a high-level language includes a contract state that needs privacy protection and that is indicated by a first privacy identifier, and a smart contract in the form of bytecode includes a contract state that needs privacy protection and that is indicated by a second privacy identifier; and the first privacy identifier is the same as or has a mapping relationship with the second privacy identifier.

Figure 7:
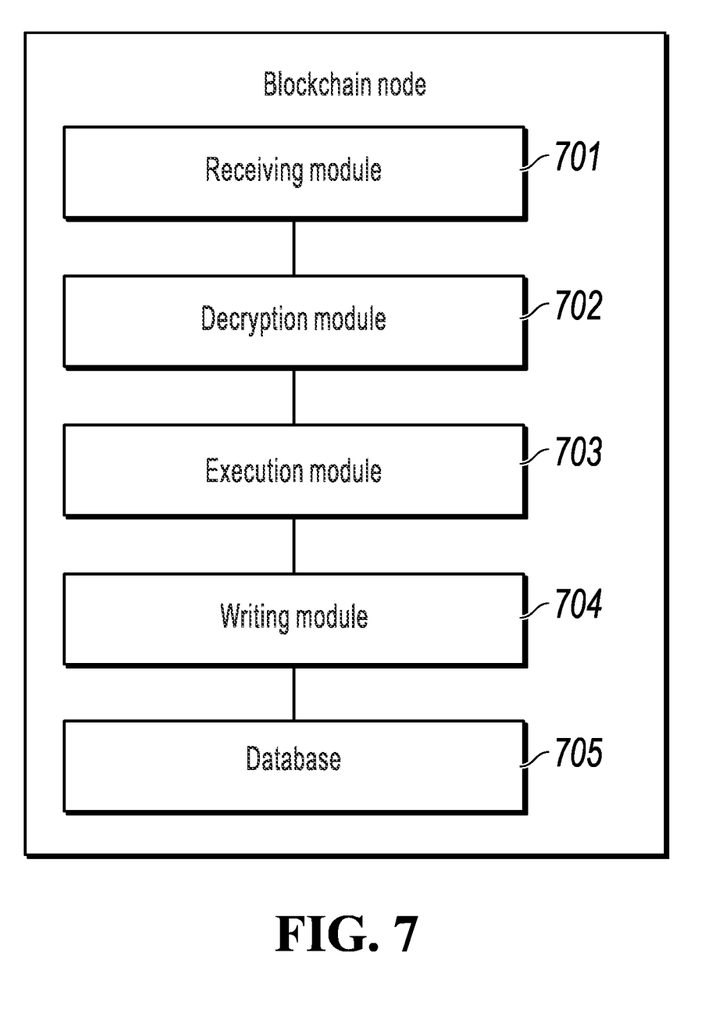
FIG. 7 is a diagram illustrating composition of node embodiments for implementing privacy protection, according to the present application.

With reference to FIG. 7, the following describes node embodiments for implementing privacy protection in a blockchain according to the present application. The node includes the following: a receiving module 701, configured to receive an encrypted transaction including a smart contract, where code of the smart contract includes a contract state indicated by a privacy identifier; a decryption module 702, configured to decrypt the code of the smart contract in the transaction; an execution module 703, configured to execute the decrypted code of the smart contract in a trusted execution environment; a writing module 704, configured to use a key to encrypt the contract state indicated by the privacy identifier, and write the encrypted contract state to a database after the execution module executes the decrypted code of the smart contract; and the database 705, configured to store the written contract state encrypted by using the key.

The contract state includes a state variable in the code written in a programming language.

A smart contract in the form of a high-level language includes a contract state that needs privacy protection and that is indicated by a first privacy identifier, and a smart contract in the form of bytecode includes a contract state that needs privacy protection and that is indicated by a second privacy identifier; and the first privacy identifier is the same as or has a mapping relationship with the second privacy identifier.

The key for symmetric encryption includes a SEAL key.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit described in the previously described embodiments can be implemented by a computer chip or an entity, or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or any combination of these devices.

For ease of description, the apparatus above is described by dividing functions into various units. Certainly, when the present application is implemented, a function of each unit can be implemented in one or more pieces of software and/or hardware.

A person skilled in the art should understand that an embodiment of the present invention can be provided as a method, a system, or a computer program product. Therefore, the present invention can use a form of hardware only embodiments, software only embodiments, or embodiments with a combination of software and hardware. Moreover, the embodiments of the present invention can use a form of a computer program product that is implemented on one or more computer-usable storage media (including but not limited to a disk memory, a CD-ROM, an optical memory, etc.) that include computer-usable program code.

The present invention is described with reference to the flowcharts and/or block diagrams of the method, the device (system), and the computer program product based on the embodiments of the present invention. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

The present application can be described in the general context of computer-executable instructions, for example, a program module. Generally, the program module includes a routine, a program, an object, a component, a data structure, etc. executing a specific task or implementing a specific abstract data type. The present application can alternatively be practiced in distributed computing environments in which tasks are performed by remote processing devices that are connected through a communications network. In a distributed computing environment, the program module can be located in both local and remote computer storage media including storage devices.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In typical configuration, the computing device includes one or more processors (CPU), an input/output interface, a network interface, and a memory.

The memory can include a form of a volatile memory, a random access memory (RAM) and/or a nonvolatile memory, etc. in a computer readable medium, such as a read-only memory (ROM) or a flash memory (flash RAM). The memory is an example of the computer readable medium.

The computer readable medium includes permanent and non-permanent, removable and non-removable media, and can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include a transitory computer readable medium (transitory media), for example, a modulated data signal and carrier.

It is worthwhile to further note that, the terms "include", "contain", or their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

Although the descriptions in the previously described content use terms "first", "second", etc. to describe various elements, the elements are not limited to these terms. These terms are only used to differentiate between elements. For example, without departing from the scope of the embodiments, first touch can be named second touch, and similarly, the second touch can be named the first touch.

Depending on the context, the word "if" can be explained as "while" ("when" or "upon"), "in response to determining", or "in response to detecting". Similarly, depending on the context, the phrase "if determining . . . " or "if detecting (the condition or event stated)" can be explained as "when determining . . . ", "in response to determining . . . ", "when detecting (the condition or event stated)", or "in response to detecting (the condition or event stated)".

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

The embodiments in the present specification are described in a progressive way. For same or similar parts of the embodiments, references can be made to the embodiments mutually. Each embodiment focuses on a difference from other embodiments. Particularly, a system embodiment is similar to a method embodiment, and therefore is described briefly. For related parts, references can be made to related descriptions in the method embodiment.

The previous descriptions are merely embodiments of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
   receiving, by a first blockchain node, an encrypted transaction comprising a smart contract that includes code, wherein the code of the smart contract comprises a contract state indicated by a privacy identifier;
   decrypting, by the first blockchain node, the encrypted transaction to obtain the code of the smart contract in plaintext;
   executing, by the first blockchain node, the code of the smart contract in plaintext in a trusted execution environment;
   encrypting, by the first blockchain node using a key, the contract state indicated by the privacy identifier; and
   writing, by the first blockchain node, the encrypted contract state indicated by the privacy identifier to a database.

2. The computer-implemented method of claim 1, wherein the smart contract of the encrypted transaction received by the first blockchain node comprises one of:
   a smart contract written by a user in a high-level language on the first blockchain node;
   a smart contract written by a user in a high-level language on a client device; or
   a smart contract in a transaction sent by the client device by using a second blockchain node.

3. The computer-implemented method of claim 1, wherein the smart contract is originally written in a high-level language, and is compiled using a compiler into bytecode before execution.

4. The computer-implemented method of claim 3, wherein the smart contract in the high-level language comprises a first privacy identifier indicating a contract state that requires privacy protection, and the smart contract in the bytecode comprises a second privacy identifier indicating a contract state that requires privacy protection; and
the first privacy identifier is the same as or has a mapping relationship with the second privacy identifier.

5. The computer-implemented method of claim 1, wherein for the encrypted transaction that comprises the smart contract and that is received by the first blockchain node, an encryption process uses a symmetric encryption method, an asymmetric encryption method, or a combination of a symmetric encryption method and an asymmetric encryption method.

6. The computer-implemented method of claim 5, wherein
a private key for symmetric encryption is used to encrypt the transaction comprising the smart contract, and the first blockchain node uses the private key for symmetric encryption to decrypt the transaction to obtain the code of the smart contract; or
a public key for asymmetric encryption is used to encrypt the transaction comprising the smart contract, and the first blockchain node uses a corresponding private key for asymmetric encryption to decrypt the transaction to obtain the code of the smart contract.

7. The computer-implemented method of claim 5, wherein the combination of a symmetric encryption method and an asymmetric encryption method comprises a digital envelope encryption method.

8. The computer-implemented method of claim 1, wherein the key comprises a key for symmetric encryption or a key for asymmetric encryption.

9. A non-transitory, computer-readable medium storing instructions executable by a computer system that upon execution cause the computer system to perform operations comprising:
receiving, by a first blockchain node, an encrypted transaction comprising a smart contract that includes code, wherein the code of the smart contract comprises a contract state indicated by a privacy identifier;
decrypting, by the first blockchain node, the encrypted transaction to obtain the code of the smart contract in plaintext;
executing, by the first blockchain node, the code of the smart contract in plaintext in a trusted execution environment;
encrypting, by the first blockchain node using a key, the contract state indicated by the privacy identifier; and
writing, by the first blockchain node, the encrypted contract state indicated by the privacy identifier to a database.

10. The non-transitory, computer-readable medium of claim 9, wherein the smart contract of the encrypted transaction received by the first blockchain node comprises one of:
a smart contract written by a user in a high-level language on the first blockchain node;
a smart contract written by a user in a high-level language on a client device; or
a smart contract in a transaction sent by the client device by using a second blockchain node.

11. The non-transitory, computer-readable medium of claim 9, wherein the smart contract is originally written in a high-level language, and is compiled using a compiler into bytecode before execution.

12. The non-transitory, computer-readable medium of claim 11, wherein the smart contract in the high-level language comprises a first privacy identifier indicating a contract state that requires privacy protection, and the smart contract in the bytecode comprises a second privacy identifier indicating a contract state that requires privacy protection; and
the first privacy identifier is the same as or has a mapping relationship with the second privacy identifier.

13. The non-transitory, computer-readable medium of claim 9, wherein for the encrypted transaction that comprises the smart contract and that is received by the first blockchain node, an encryption process uses a symmetric encryption method, an asymmetric encryption method, or a combination of a symmetric encryption method and an asymmetric encryption method.

14. The non-transitory, computer-readable medium of claim 13, wherein
a private key for symmetric encryption is used to encrypt the transaction comprising the smart contract, and the first blockchain node uses the private key for symmetric encryption to decrypt the transaction to obtain the code of the smart contract; or
a public key for asymmetric encryption is used to encrypt the transaction comprising the smart contract, and the first blockchain node uses a corresponding private key for asymmetric encryption to decrypt the transaction to obtain the code of the smart contract.

15. The non-transitory, computer-readable medium of claim 13, wherein the combination of a symmetric encryption method and an asymmetric encryption method comprises a digital envelope encryption method.

16. The non-transitory, computer-readable medium of claim 9, wherein the key comprises a key for symmetric encryption or a key for asymmetric encryption.

17. A computer-implemented system, comprising:
one or more computers; and
one or more computer memory devices interoperably coupled with the one or more computers and having tangible, non-transitory, machine-readable media storing instructions that, when executed by the one or more computers, cause the one or more computers to perform operations comprising:
receiving, by a first blockchain node, an encrypted transaction comprising a smart contract, wherein code of the smart contract comprises a contract state indicated by a privacy identifier;
decrypting, by the first blockchain node, the encrypted transaction to obtain the code of the smart contract in plaintext;
executing, by the first blockchain node, the code of the smart contract in plaintext in a trusted execution environment;
encrypting, by the first blockchain node using a key, the contract state indicated by the privacy identifier; and
writing, by the first blockchain node, the encrypted contract state indicated by the privacy identifier to a database.

18. The computer-implemented system of claim 17, wherein the smart contract of the encrypted transaction received by the first blockchain node comprises one of:
a smart contract written by a user in a high-level language on the first blockchain node;

a smart contract written by a user in a high-level language on a client device; or a smart contract in a transaction sent by the client device by using a second blockchain node.

19. The computer-implemented system of claim 17, wherein the smart contract is originally written in a high-level language, and is compiled using a compiler into bytecode before execution.

20. The computer-implemented system of claim 19, wherein the smart contract in high-level language comprises a first privacy identifier indicating a contract state that requires privacy protection, and the smart contract in the bytecode comprises a second privacy identifier indicating a contract state that requires privacy protection; and the first privacy identifier is the same as or has a mapping relationship with the second privacy identifier.

* * * * *